(12) United States Patent
Bolarinwa

(10) Patent No.: US 8,549,469 B2
(45) Date of Patent: Oct. 1, 2013

(54) SYSTEM AND METHOD FOR SPECIFICATION AND IMPLEMENTATION OF MVC (MODEL-VIEW-CONTROLLER) BASED WEB APPLICATIONS

(76) Inventor: Akin B Bolarinwa, Duluth, GA (US)

( * ) Notice: Subject to any disclaimer, the term of this patent is extended or adjusted under 35 U.S.C. 154(b) by 1483 days.

(21) Appl. No.: 11/551,721

(22) Filed: Oct. 22, 2006

(65) Prior Publication Data

US 2009/0158243 A1    Jun. 18, 2009

(51) Int. Cl.
G06F 9/44    (2006.01)

(52) U.S. Cl.
USPC ........................................................ 717/105

(58) Field of Classification Search
None
See application file for complete search history.

(56) References Cited

U.S. PATENT DOCUMENTS

| | | | |
|---|---|---|---|
| 7,114,127 B2 * | 9/2006 | Weitzman | 715/764 |
| 7,802,207 B2 * | 9/2010 | Agboatwalla et al. | 715/866 |
| 2001/0018696 A1 * | 8/2001 | Hori et al. | 707/513 |
| 2003/0023953 A1 * | 1/2003 | Lucassen et al. | 717/106 |
| 2003/0058277 A1 * | 3/2003 | Bowman-Amuah | 345/765 |
| 2003/0197726 A1 * | 10/2003 | Weitzman | 345/744 |
| 2003/0200347 A1 * | 10/2003 | Weitzman | 709/310 |
| 2004/0031058 A1 * | 2/2004 | Reisman | 725/112 |
| 2004/0064802 A1 * | 4/2004 | Cherdron et al. | 717/100 |
| 2004/0153509 A1 * | 8/2004 | Alcorn et al. | 709/205 |
| 2004/0153968 A1 * | 8/2004 | Ching et al. | 715/513 |
| 2005/0198042 A1 * | 9/2005 | Davis | 707/10 |
| 2005/0268277 A1 * | 12/2005 | Reeder et al. | 717/104 |
| 2005/0289457 A1 * | 12/2005 | Obasanjo et al. | 715/513 |
| 2006/0053364 A1 * | 3/2006 | Hollander et al. | 715/512 |
| 2006/0095892 A1 * | 5/2006 | Banavar et al. | 717/109 |
| 2006/0101385 A1 * | 5/2006 | Gerken et al. | 717/106 |
| 2006/0101393 A1 * | 5/2006 | Gerken et al. | 717/109 |
| 2006/0156279 A1 * | 7/2006 | Nelson et al. | 717/104 |
| 2006/0168562 A1 * | 7/2006 | Emek et al. | 717/110 |
| 2006/0195779 A1 * | 8/2006 | McElroy et al. | 715/501.1 |
| 2006/0206890 A1 * | 9/2006 | Shenfield et al. | 717/174 |
| 2007/0033567 A1 * | 2/2007 | Carlson et al. | 717/100 |
| 2007/0074100 A1 * | 3/2007 | Yan | 715/505 |
| 2007/0179939 A1 * | 8/2007 | O'Neil et al. | 707/4 |

* cited by examiner

*Primary Examiner* — Wei Zhen
*Assistant Examiner* — Adam R Banes
(74) *Attorney, Agent, or Firm* — Charlena Thorpe, Esq.; The Law Office of Charlena Thorpe, Inc.

(57) ABSTRACT

A system and method for requirement specification for entire MVC (Model-View-Controller) based web applications, by providing processes and artifacts that are suitable for each of the areas of concerns, and cohesively combining them with standard object modeling. Some of the areas provided for include general static as well as the dynamic aspects presentation, web navigation and actions, and view to model data mapping; also provides the system and method to create application for target platforms using the resulting design specification and platform mapping information.

18 Claims, 23 Drawing Sheets

Model-View-Controller (MVC) Architecture

Model-View-Controller (MVC) Architecture 35
36

Review Order        Apply for DWIZ Card and save 10% in discount.
Payment Information
 * Name on Card [_____]   * Type [MasterCard ▼]
 * Card Number [_____]   * Expiration [MM▼] / [YY▼]
 (no spaces)
Billing Address    Same as Shipping ☐
 Address [_____]
 City [_____]
 State [__]    Zip Code [_____]

[Submit Order]
37

Fig. 6A

Review Order
Payment Information   38
 * Name on Card [_____]   * Type [DWIZ ▼]
 * Card Number [_____]   * Expiration [MM▼] / [YY▼]   39
 (no spaces)
Billing Address    Same as Shipping ☐ 41   42
 40
 Address [_____] 43
 City [_____]
 State [__]    Zip Code [_____] 47
 45    46

[Submit Order]
44

Fig. 6B

```
<!DOCTYPE HTML PUBLIC "-//W3C//DTD HTML 4.0 Transitional//EN">
<HTML>
<HEAD> <TITLE>Credit Card Payment Information</TITLE></HEAD>
<BODY>
    <FORM >
        <INPUT type="hidden" name="paymentMethod">
        <table border="0" width="580" align="center">
            <tr>
                <td><a href="#">Review Order</a></td>
                <td>
                <!--segment id= "applyForCc"-->
                    <div align="right">
                        <a href="applyCC.do">Apply for DWIS Card and save 10% in discount.</a>
                    </div>
                <!--/segment -->
                </td>
            </tr>
        </table>
        <TABLE cellSpacing="0" cellPadding="0" width="580" align="center" border="0">
            <TBODY>
            <TR>
                <TD class="darkbg" colSpan="7"><B class="whitefg">Payment Information</B></TD>
            </TR>
            <TR>
                <TD colSpan="7"><IMG height="5" src="space.gif" width="580"></TD>
            </TR>
            <TR>
                <TD align="right">
                    <SPAN class="fatal">*</SPAN> <B>
                    <SPAN>Name on Card</SPAN></B>
                </TD>
                <TD><IMG height="1" src="space.gif" width="5"></TD>
                <TD><INPUT tabIndex="1" name="nameOnCard"></TD>
                <TD><IMG height="1" src="space.gif" width="5"></TD>
                <TD colSpan="3"><SPAN class="fatal">*</SPAN> <B>Type</B>
                    <SELECT tabIndex="2" name="cardtype">
                        <!--segment type="visibility" value="false" -->
                        <OPTION value=MC selected>MasterCard</OPTION>
                        <OPTION value=VISA>Visa</OPTION>
                        <OPTION value=DISC>Discover</OPTION>
                        <OPTION value=AMEX>American Express</OPTION>
                        <!--/segment -->
                    </SELECT>
                </TD>
            </TR>
            <TR>
                <TD colSpan="7"><IMG height="5" src="space.gif" width="580"></TD>
            </TR>
            <TR>
                <TD vAlign="top" align="right"> <SPAN class="fatal">*</SPAN> <B><SPAN>Card
                    Number</SPAN><BR/> <I>(no spaces)</I></B> </TD>
                <TD><IMG height="1" src="space.gif" width="5"></TD>
                <TD>
                    <!-- DO NOT ECHO BACK THE CARD NUMBER--EVER.
                         Doing so violates CISP and other security standards. -->
                    <INPUT tabIndex="3" name="cardNumber"> </TD>
                <TD><IMG height="1" src="space.gif" width="5"></TD>
```

Fig. 7A

```
<TD colSpan="3">
  <SPAN class="fatal">*</SPAN> <B><SPAN>Expiration</SPAN></B>  
  <SELECT tabIndex="4" name="expirationMonth">
    <OPTION value="00" selected>MM</OPTION>
    <OPTION value="01">01</OPTION> <OPTION value="02">02</OPTION>
    <OPTION value="03">03</OPTION> <OPTION value="04">04</OPTION>
    <OPTION value="05">05</OPTION> <OPTION value="06">06</OPTION>
    <OPTION value="07">07</OPTION> <OPTION value="08">08</OPTION>
    <OPTION value="09">09</OPTION> <OPTION value="10">10</OPTION>
    <OPTION value="11">11</OPTION> <OPTION value="12">12</OPTION>
  </SELECT>
  /
  <SELECT tabIndex="5" name="expirationYear">
    <OPTION value="00" selected>YY</OPTION>
    <OPTION value="06">06</OPTION>
    <OPTION value="07">07</OPTION>
    <OPTION value="08">08</OPTION>
    <OPTION value="09">09</OPTION>
    <OPTION value="10">10</OPTION>
    <!--OPTION value=11>11</OPTION>omitted options<OPTION value=30>30</OPTION-->
  </SELECT> </TD>
</TR>
<TR>
  <TD class="darkbg" colSpan="3"><B class="whitefg">Billing Address</B></TD>
  <TD class="darkbg" colSpan="4"><B class="whitefg">Same as Shipping</B>
    <input type="checkbox" name="sameAsShipping" tabIndex="6">
  </TD>
</TR>
<TR>
  <TD colSpan="7"><IMG height="5" src="space.gif" width="580"></TD>
</TR>
<TR>
  <TD align="right"><B><SPAN>Address</SPAN></B></TD>
  <TD><IMG height="1" src="space.gif" width="5"></TD>
  <TD colSpan="5"><INPUT name="billingAddress" tabIndex="7" size="50"></TD>
</TR>
<TR>
  <TD align="right"><B><SPAN>City</SPAN></B></TD>
  <TD><IMG height="1" src="space.gif" width="5"></TD>
  <TD colSpan="5"><INPUT name="billingCity" tabIndex="8" size="50"></TD>
</TR>
<TR>
  <TD align="right"><B><SPAN>State</SPAN></B></TD>
  <TD><IMG height="1" src="space.gif" width="5"></TD>
  <TD><INPUT name="billingState" tabIndex="9" size="2" maxlength="2"></TD>
  <TD><IMG height="1" src="space.gif" width="5"></TD>
  <TD colSpan="3"> <B>Zip Code</B>
    <INPUT name="billingZipCode" tabIndex="10" size="5" maxlength="5">
  </TD>
</TR>
<TR>
  <TD colSpan="7"><IMG height="5" src="space.gif" width="580">
    <input tabindex="11" type="submit" value="Submit Order!" name="submitButton">
  </TD>
</TR>
<TR>
  <TD colSpan="7"><IMG height="5" src="space.gif" width="580"></TD>
</TR>
</TBODY>
</TABLE>
</FORM>
<BODY>
<HTML>
```

| Page Descriptor | | | |
|---|---|---|---|
| id | pages.payByCc.html | Page | pages.payByCc.jsp |
| description | | | |

| Link Descriptors | | | | | | |
|---|---|---|---|---|---|---|
| id | source | path | handlerClass | handlerMethod | security | resultId | resultPath |
| 1 | Review Order | orderSummary.do | | | | | |
| 2 | Apply for DWIZ | applyForCc.do | | | | | |
| 3 | /form[payByCcForm] /element[submitButton] | payByCc.do | com.xyz.ecommerce.site. CcPaymentProcess | | | success | result.jsp |
| 4 | | payByCc.do | | | | failure | retry.jsp |

| Form Descriptor | | | | | | | |
|---|---|---|---|---|---|---|---|
| id | payByCcForm | description | | | | | |
| sequence | | | clientValidate | | | | |
| template | | | serverValidate | | | | |
| object | | payByCcForm | | | | | |
| class | | com.xyz.ecommerce.site.PayByCcForm | | | | | |
| Element Descriptors | | | | | | | |
| id | caption | object/property | type | value | validationType | required | behavior |
| paymentMethod | | paymentMethod | hidden | | | | |
| nameOnCard | Name on Card | nameOnCard | text | | | | |
| cardType | Type | cardType | select | | | | |
| cardType | | cardTypes | options | | | | |
| cardNumber | Card Number | cardNumber | text | | CC number validation | | |
| expirationMonth | Expiration (MM) | expirationMonth | select | | | | |
| expirationYear | Expiration (YY) | expirationYear | select | | | | |
| sameAsShipping | Same as Shipping | sameAsShipping | checkbox | | | | |
| billingAddress | Address | billingAddress | text | | | | |
| billingCity | City | billingCity | text | | | | |
| billingState | State | billingState | text | | | | |
| billingZipCode | Zip Code | billingZipCode | text | | Zip code 5 digit validation | | |
| submitButton | Submit Order! | | button | | | | |

Fig. 9

| segment descriptors | | | | | |
|---|---|---|---|---|---|
| id | type | description | visible | enable | behaviour |
| applyForCc | simpleText | Apply for DWIZ | | | userHasNoSubcription |

Fig. 10

| behavior descriptors | | | | | |
|---|---|---|---|---|---|
| id | description | object | property | type | value |
| userHasNoSubcription | Checks whether user has subscription | payByCcForm | userHasSubcription | equal | false |

Fig. 11

Selection of Mock HTML Source Code for Conversion

Converted Source Code Showing Framework Related Declarations

Display of Candidate Elements for Conversion with Decoration

Selection of Candidate Element for Conversion to Active Element

Converted Element Showing Associated Converted Code.

Converted Elements with Associated Entry Sheet for Descriptor Data

Segment Selection for Application of Behavior

Segment with Behavior Applied, Showing Sheet for Descriptor Entry

Use Case: Credit Card Payment

| Field Name | Field Description |
|---|---|
| Assumption | Registered User, logged into the system. |
| Pre-condition | User selects items from the site, placing them in the shopping cart.<br><br>User had selected the checkout option<br><br>Summary of purchases plus shipping presented<br><br>Payment options is presented to user |
| Use Case initiation | Use case starts when the user select the credit card payment from the payment options |
| Use Case Dialog | The system presents the credit card payment form.<br><br>If user is not company's DWIZ card member<br><br>    System presents a message and a link for subscribing for the card membership. If user clicks on this link, the user is taken to the membership subscription page. After which the user would return to the payment page.<br><br>The *system* presents *fields* to prompt the *user* for the *name on the card*, the *type of the card*, card number, and expiration. All fields are presented initially as blank (except type of card) for security reasons.<br><br>The types of the cards allowed are dynamically provided by the system. If the buyer were a card member of the company's own DWIZ, this card would be shown as the default.<br><br>User presses the submit Order button to complete the questionnaire.<br><br>Alternate, user presses other link on the page: return to payment options. |
|  | System validates the submitted questionnaire.<br><br>if entry valid, system present confirmation screen<br><br>else system represents the credit card payment form, with error messages. |

Fig. 20

```
<link
    path="/payByCc"
51⟶handlerClass=" com.xyz.ecommerce.site.CcPaymentProcess"
    sourceForm=" payByCcForm">
    <result resultId="success" resultPath="/result.jsp" />
    <result resultId="failure" resultPath="/retry.jsp" />
</link>

<action-mappings>
52⟶<action
        path="/payByCc"
        type=" com.xyz.ecommerce.site.CcPaymentProcess"
        name=" payByCcForm">
            <forward name="success" path="/result.jsp" />
            <forward name="failure" path="/retry.jsp" />
    </action>

</action-mappings>

<form-beans>

53⟶<form-bean name="payByCcForm"
    type="com.xyz.ecommerce.site.PayByCcForm"/>

</form-beans>

<form-beans>
    <form-bean name="payByCcForm"
type="org.apache.struts.action.DynaActionForm">
54      <form-property name="paymentMethod" type="java.lang.String"/>
        <form-property name="nameOnCard" type="java.lang.String"/>
        <form-property name="cardType" type="java.lang.String"/>
55⟶<form-property name="cardNumber" type="java.lang.String"/>
        <form-property name="expirationMonth" type="java.lang.String"/>
        <form-property name="expirationYear" type="java.lang.String"/>
        <form-property name="sameAsShipping" type="java.lang.String"/>
        <form-property name="billingAddress" type="java.lang.String"/>
        <form-property name="billingCity" type="java.lang.String"/>
        <form-property name="billingState" type="java.lang.String"/>
        <form-property name="billingZipCode" type="java.lang.String"/>
    </form-bean>
</form-beans>
```

Fig. 21

```
<!DOCTYPE HTML PUBLIC "-//W3C//DTD HTML 4.0 Transitional//EN"> <HTML>
<html:html >
<%@ page language="java" contentType="text/html; charset=iso-8859-1" %>
<%@ taglib uri="/WEB-INF/struts-html.tld" prefix="html" %>
<%@ taglib uri="/WEB-INF/display.tld" prefix="display" %>
<%@ taglib uri="/WEB-INF/struts-bean.tld" prefix="bean" %>
<%@ taglib uri="/WEB-INF/struts-logic.tld" prefix="logic" %>
<%@ taglib uri="/jstl-c" prefix="c" %>
<HEAD> <TITLE>Credit Card Payment Information</TITLE></HEAD>
<BODY>
    <html:form>
      <html:hidden property="paymentMethod"/>
      <table border="0" width="580" align="center">
        <tr>
          <td><html:link href="#">Review Order</html:link></td>
          <td>
          <!--segment id="applyCC"-->
          <logic:equal name="payByCcForm" property="userHasSubcription"
                    value="false" >
          <div align="right">
          <html:link href="applyCC.do">
              Apply for DWIZ Card and save 10% in discount.
          </html:link>
          </div>
          </logic:equal >
          <!--segment -->
          </td>
          </tr>
        </table>
     <TABLE cellSpacing="0" cellPadding="0" width="580" align="center"
border="0">
        <TBODY>
          <TR>
          <TD class="darkbg" colSpan="7"><B class="whitefg">Payment
Information</B></TD>
          </TR>
          <TR>
          <TD colSpan="7"><IMG height="5" src="space.gif"
width="580"></TD>
          </TR>
          <TR>
          <TD align="right"><SPAN
class="fatal">*</SPAN> <B><SPAN>Name on Card</SPAN></B></TD>
          <TD><IMG height="1" src="space.gif" width="5"></TD>
          <TD><html:text tabIndex="1" property="nameOnCard"/></TD>
          <TD><IMG height="1" src="space.gif" width="5"></TD>
          <TD colSpan="3"><SPAN class="fatal">*</SPAN> <B>Type</B>
              <html:select tabIndex="2" property="cardType">
                  <html:optionsCollection  name="payByCcForm"
                  property="cardTypes"/>
              </html:select>
          </TD>
          </TR>
```

Fig. 22A

```
<TR>
    <TD colSpan="7"><IMG height="5" src="space.gif"
width="580"></TD>
</TR>
<TR>
    <TD vAlign="top" align="right">
        <SPAN class="fatal">*</SPAN> <B><SPAN>Card
      Number</SPAN><BR/> <I>(no spaces)</I></B>
    </TD>
    <TD><IMG height="1" src="space.gif" width="5"></TD>
    <TD> <!-- DO NOT ECHO BACK THE CARD NUMBER--EVER.
        Doing so violates CISP and other security standards. -->
        <html:text tabIndex="3" property="cardNumber"/> </TD>
    <TD><IMG height="1" src="space.gif" width="5"></TD>
    <TD colSpan="3">
    <SPAN
class="fatal">*</SPAN> <B><SPAN>Expiration</SPAN></B>  
        <html:select tabIndex="4" property="expirationMonth">
            <OPTION value="00" selected>MM</OPTION>
            <OPTION value="01">01</OPTION>
            <OPTION value="02">02</OPTION>
            <OPTION value="03">03</OPTION>
            <OPTION value="04">04</OPTION>
            <OPTION value="05">05</OPTION>
            <OPTION value="06">06</OPTION>
            <OPTION value="07">07</OPTION>
            <OPTION value="08">08</OPTION>
            <OPTION value="09">09</OPTION>
            <OPTION value="10">10</OPTION>
            <OPTION value="11">11</OPTION>
            <OPTION value="12">12</OPTION>
        </html:select>      /
        <html:select tabIndex="5" property="expirationYear">
            <OPTION value="00" selected>YY</OPTION>
            <OPTION value="06">06</OPTION>
            <OPTION value="07">07</OPTION>
            <OPTION value="08">08</OPTION>
            <OPTION value="09">09</OPTION>
            <OPTION value="10">10</OPTION>
            <!-- OPTION value=11>11</OPTION> ...up to <OPTION
value=30>30</OPTION-->
        </html:select> </TD>
</TR>
<TR>
    <TD class="darkbg" colSpan="3"><B class="whitefg">Billing
Address</B></TD>
    <TD class="darkbg" colSpan="4"><B class="whitefg">Same as
Shipping</B>
        <html:text property="sameAsShipping" tabIndex="6"/>
    </TD>
</TR>
```

Fig. 22B

```
<TR>
    <TD colSpan="7"><IMG height="5" src="space.gif" width="580"></TD>
</TR>
<TR>
    <TD align="right"><B><SPAN>Address</SPAN></B></TD>
    <TD><IMG height="1" src="space.gif" width="5"></TD>
    <TD colSpan="5">
        <html:text property="billingAddress" tabIndex="7" size="50"/>
    </TD>
</TR>
<TR>
    <TD align="right"><B><SPAN>City</SPAN></B></TD>
    <TD><IMG height="1" src="space.gif" width="5"></TD>
    <TD colSpan="5">
        <html:text property="billingCity" tabIndex="8" size="50"/>
    </TD>
</TR>
<TR>
    <TD align="right"><B><SPAN>State</SPAN></B></TD>
    <TD><IMG height="1" src="space.gif" width="5"></TD>
    <TD>
        <html:text property="billingState" tabIndex="9" size="2"
            maxlength="2"/>
    </TD>
    <TD><IMG height="1" src="space.gif" width="5"></TD>
    <TD colSpan="3"> <B>Zip Code</B>
        <html:text property="billingZipCode" tabIndex="10" size="5"
            maxlength="5"/>
    </TD>
</TR>
<TR>
    <TD colSpan="7"><IMG height="5" src="space.gif" width="580">
        <html:submit tabindex="11" value="Submit Order!"
            property="submitButton"/>
    </TD>
</TR>
<TR>
    <TD colSpan="7"><IMG height="5" src="space.gif" width="580"></TD>
</TR>
</TBODY>
</TABLE>
</html:form>
</BODY>
</html:html >
```

Fig. 22C

SYSTEM AND METHOD FOR SPECIFICATION AND IMPLEMENTATION OF MVC (MODEL-VIEW-CONTROLLER) BASED WEB APPLICATIONS

BACKGROUND OF THE INVENTION

1. Field of the Invention

The present invention relates to data processing systems. In particular, it relates to methods for software development and specification.

2. Description of the Related Art

Some methodologies and development approaches have evolved that lead to highly structured software development and implementation processes. Examples of these are Object Oriented Analysis and Design using Unified Modeling Language (UML) and Model Driven Architecture (MDA). The description of MDA can be found at http://www.omq.org/mda/

The strength of MDA lies mainly in its emphasis on design and specification documentation before the start of the implementation phase; furthermore, allowing the implementation to be driven by such design document using few distinct steps. This approach is not applied to the entire design and implementation of active web applications.

Although, specific areas of such applications are modeled and implemented using the MDA approach; such approach is limited to parts and not the whole application. The reasons for this are expanded on below.

For active web applications, the use of Model View Controller architecture (MVC) reduces complexity by dividing the design and implementation into separate areas of concerns; this is illustrated in FIG. 1. Further division of MVC applications into finer layers, illustrated in FIG. 2, provide easier match to the modeling requirements.

Object Oriented Programming Analysis and Development is the standard in the software industry; for with UML (Unified Modeling Language) is the widely accepted means of modeling applications using such approach.

Whereas Unified Modeling Language (UML) could easily be applicable to Model segment 7, its application to the other segments is limited. For the Controller segment, only the Action Handler 6 could be modeled easily with UML, the rest of the controller specification and the View segment stand out as areas that are not amenable to MDA. This removes the possibilities of arriving at comprehensive modeling documentations, which could be collaboratively produced and approved, before commencement of the implementation phase.

At first glance it would appear as if there are modeling tools for MVC applications within UML suite. For instance, the flow logics that are both related to the controller and individual view pages are featured in the Use Case, Activity and Sequence diagrams.

By referring to the official scope of these diagrams, it would be clear that their focus and perspectives are not suitable for these purposes. The reference is the UML diagrams overview (OMG (2003a): Available at http://www.omg.org/docs/ptc/03-09-15.pdf From these definitions, Use Case defines behavior of the system to an outside user, describing what can be done with the system, not the transformation, flow and assembly of the view pages. The Activity Diagrams focuses on logical flow that is of higher abstraction than physical pages, as stated in its definition: computations, workflows, object flow and control flow. Again, the Sequence diagrams are more suitable for activity and action sequencing than page sequencing. Furthermore, the sequencing on a page could involve multiple links on the page, multiple forms submission, as well as intra-page activities, like frame loading and Ajax refresh.

The presentation aspects of the View present modeling challenges, not only for web applications, but also for all applications in general. There are proposals to provide special extension to UML for such segments; however, none of these have yielded much fruition. An example of this could be seen in the article titled UML Activity Diagrams: Detailing User Interface Navigation on the site, http://www-128.ibm.com/developerworks/rational/library/4697.html. This involves additional definition of semantics and stereotypes beyond those available from standard UML. Multiple diagrams, that are not well integrated, would be required to capture the various aspects of UI; however, basic issues like the presentation look and feel and dynamics aspects, as well as intra-page or intra-frame activities are omitted.

In providing such extensions, the first major issue to surmount is the expansiveness of the documentation of the User Interface specification. By definition, user interface involves the whole user experience in interfacing with the computer and the resulting system responses or invocations. This covers a wide area. Furthermore, there is a need to accommodate the varying platforms. Platforms ranging from those pertaining to mobile devices and browser based platforms, to graphic based windows platforms of many flavors (Windows, MAC, Linux, etc.). All these have differences in event models, specifications of look and feel, and their repertoire of widgets. Widget is the term used for window components, like list boxes, buttons, etc., that are available on specific platform.

The lack of means of providing design models or design specifications is a direct contravention of well-known best practices. One long-standing process dubbed Software Development Life Cycle (SDLC), places specification and design phase before implementation. This was later presented as Model Driven Architecture, the common thread being the emphasis on having design blueprint or models, before embarking on implementation.

The current industry approaches lean toward User Interface (UI) components frameworks. These approaches encourage design as you build process, providing easy drag-and-drop design and assembly of graphic solutions. This emphasis is ostensible in the Java Specification Request 127 for Java Server Faces (RTM Sun Microsystems), defined at http://www.jcp.org/en/jsr/detail?id=127. The Webform Component provided by Microsoft Corporation also uses such approach for web applications development.

Whereas such component design and build approaches have potential with smaller projects of few pages and simple navigational scheme; the effect of lack of design phase becomes deleterious for larger projects. The encapsulation that they provide with these components is usually considered a plus. However, the negative aspect is the combination of areas of diverse disciplines into one, whereas there are page design, models and controller specialties and skills that could be provided by multiple individuals.

OBJECTS AND ADVANTAGES

As highlighted in the related arts discussion, there exist voids in the modeling and specifying of active web applications, especially in the areas involving the View and Controller aspects of such applications.

This invention provides means of closing such voids, by providing a process of arriving at comprehensive specifications for active web applications, and means of mapping such specification into fully implemented applications. The advantages of these are highlighted below:

Lower Project Risks

The prevailing processes that do not involve comprehensive modeling or design specifications, contribute greatly to the uncertainty of delivery of applications, in terms of duration and cost that accompany such projects. The capture of design and specification that this invention provides guarantee a smoother and predictable implementation process.

Protection of Software Investment

Such design documentation would allow expeditious undertaking of subsequent redesign, implementation of new features and enhancement, as well as general review, analysis and troubleshooting; thus, future proofing these applications.

Ease of Implementation

The specifications provided in accordance with the provisions of this invention, would reduce application implementation to a few simple manageable steps. It needs to be emphasized that the step involving the completion of the descriptors, could involve design cycle and collaborations. There are a lot of considerations that would involve topics like the design of the transfer objects, their life cycle in term of application, session, or request scopes, security, internationalization and validation. Once the documentation has been completed, the implementation would involve simple steps. Some of the bright ideas, like Design Patterns, used in the software industry have parallel or origination from the building construction industry. This is no different from the structural engineering and architectural knowledge that the design of buildings involves. Whereas, once the construction blueprints are out, the process shifts into implementation that only requires skilled labor. The steps involved in the implementation are illustrated with FIG. 12 to FIG. 19.

Optimum Employment of Skills

The division of the requirement gathering into areas of concerns, by the present invention, closely matches the variety of skill sets that are employed for development of active web applications.

Such skills comprise of business analysts, model programmers that specialize in domain object, business logic, middleware and database related development, web tier programmers that specialize in active web development, as well as page designers that specialize in static and dynamic HTML design, scripting languages, graphics and animation. There could be further divisions, for instance, with the web tier, which the model, controller and view segments could involve different skills, varying from object and data transformation to pure tag library based programming.

The deliverables that are in accordance with the embodiments and operations of this invention are targeted for initiation by individual skills practitioner while providing avenue of additional contribution from others. For instance the mock-pages would be the domain of a page designer, whereas a web tier programmer would better undertake the extraction of active elements and descriptor from mock-page source code. Furthermore, the descriptors mapping entries to domain data would need input from the model programmers.

The optimum employment of the required skills, whereas providing for collaborations, is a major advantage of employing this invention over the prevailing arts and practices.

Common Requirement Gathering Tool

Apart from the requirement gathering means that this invention provides; it also provides a common means of documenting the requirement.

All of the specification artifacts provided for by this invention, are platform agnostic. They capture the essentials of MVC applications, without commitment to any brand or flavor. It is only at the start of implementation phase, that the issue of mapping these artifacts to target platforms comes into play.

This portends numerous advantages over the prevailing art, since organizations usually find themselves being involved with multiple platforms. The requirement gathering would be without commitment to a certain direction.

Furthermore, since MVC is a technique of separating areas of concerns, this invention could be applied to any active web page that in their programming, such layering architectures are observed. The employment of MVC could be in terms of commonly available frameworks, like Struts, Velocity, JSF, just to name a few. It could be a homegrown framework, or a set of programming standards. As long as the areas of concerns are well separated or layered. It should thus be obvious that, in applying this invention, those skilled in the art, could utilize this invention as a common means of requirement gathering for a variety of application platforms.

Presentation Layout Scheme

One of the problems that are encountered with active web development is layout, which involves the arrangement of visible elements on the page. Whenever portions of pages could be made invisible at runtime, it would always present a possibility whereby the ultimate layout of the pages is not optimum or aesthetically unappealing. The annotation scheme provided by this invention allows the early demarcation of active segments, which would allow the page designer to take into consideration the dynamic aspects of such layout at the early stage of development. The comments style demarcation could be used to prepare the visual freeze by enabling the combination of segments, as they would be enabled at run-time. Thus ensuring that the layout of the visual freezes would match the layout at run-time, as long as the combination of segments are enabled manually, in the exact manner they would be enabled automatically using the server behaviors.

SUMMARY OF INVENTION

A system and method for requirement specification for entire MVC (Model-View-Controller) based web applications.

This invention involves the division of areas of concern, leveraging such separations already provided by the MVC architecture. Providing specification processes and artifacts that are suitable for each of these areas of concerns, and cohesively combining them with standard modeling artifacts.

The starting point is the standard modeling process that capture the domain data and flow; followed by the creation of content artifacts that capture the static representation of the pages as well as client only activities. The invention provides schemes and annotations for identification of static elements and segments, on the source content artifacts, for correlation with the server activities.

Another step of the invention involves capture of web navigation and actions, view to model data mapping and server behavior in relation to specific elements, as well as segments, into sets of descriptors.

These descriptors, illustrated in FIG. 5, that make up the core of the artifacts for the specification, comprise of the page type 26 that captures the information on the series of pages in an application. This page descriptors, further encapsulate the other descriptors that capture aspects of the pages. The link descriptor 27 captures the paths and actions referenced and traversed by the page. The pertinent information includes the handler class and method, the parameters passed and their sources in the domain model.

The form descriptor 28 captures the binding of the form data to the domain model, as well as those of its constituent elements 33. The component descriptor 34 also captures the binding of special components to the domain data.

The segment descriptors 29 capture the information on portions of the pages that could be dynamically manipulated based states maintained within the controller and the domain data, in terms of server side behaviors 30.

It is these set of artifacts, including the content artifact, sets of descriptors and standard models, that would become the blueprint for the implementation steps of the invention.

The implementation steps comprise of, conversion of static elements in the content artifacts to their active equivalent using mapping tables, entry of active data as specified in the descriptors and the application of behaviors and invisible elements to the source content artifact.

DESCRIPTION OF THE DRAWINGS

For a more complete understanding of the present invention, reference is now made to the following descriptions taken in combination with the accompanying drawing, in which:

FIGS. 6A and 6B show two screen mock-up screen captures for the application used to illustrate the operations of the preferred embodiment of this invention; and FIGS. 7A and 7B show the HTML source code for the mock-up screens used to illustrate the operations of the preferred embodiment of this invention; and FIG. 8 shows, in tabular form, the link descriptors with the parent page descriptor, for the application used to illustrate the operations of the embodiment of this invention; and FIG. 9 shows, in tabular form, the elements descriptors with the parent form descriptor, for the application used to illustrate the operations of the embodiment of this invention; and FIG. 10 shows, in tabular form, the segment descriptors for the application used to illustrate the operations of the embodiment of this invention; and FIG. 11 shows, in tabular form, the behavior descriptors for the application used to illustrate the operations of the embodiment of this invention; FIG. 20 shows the Use Case Narrative for the application used to illustrate the operation of the preferred embodiment of this invention.

FIG. 21 shows the accumulated Controller information, which is a result of operations of this invention.

FIG. 22A, FIG. 22B and FIG. 22C shows the converted source code, to the format of Struts Framework; used to illustrate the operations of this invention.

DETAIL DESCRIPTION—PREFERRED EMBODIMENT

Glossary of Terms

The following glossary of terms is provided in connection with the discussion herein:

Active elements: Page elements that require server activities in their rendering, either for their appearance or data content. For example, text could be included in HTML document, or else text that the server obtained from database could be inserted into the document. The latter is active.

Descriptors: A document for capturing specific information, based on schema or template. This could be in form of text based tables, spreadsheet, database table, XML document, or property sheet.

Domain Object or Data: Organizational data and business rules encapsulated in objects or database tables.

Mock-up: By definition, mock-up is a prototype; as used here, it refers to high-fidelity prototype for interface screens. Mock-up source code refers to the program source code used in producing the mock-up pages.

Server behavior: Server behaviors or Server side behaviors, characterize the server activities that are employed in the rendering of the content. The term behavior refers to server activities involving the presentation only. As used here, auto-population or data extraction aspect of the server behavior, is captured under data mapping.

Source content artifacts: Source code or artifacts used in the rendering of web pages, to produce the final contents. In the preferred embodiment of this invention, HTML and their associated style sheet, images and scripts are being referred to.

Visual Freeze: This is the final set of screens that are included with the final requirement. They are usually created for the mock-up prototypes of the screen, using some form of screen capture.

In removing the voids identified in the background on the prevailing arts, this invention provides solutions for specification and implementation of MVC (Model-View-Controller) based web applications, by providing means to decompose such applications into specific areas of concerns, utilizing appropriate means for design specification for these separate areas of concerns.

These artifacts, along with standard object models, constitute the specifications, which eventually become the blueprint for the implementation.

Figure 1:
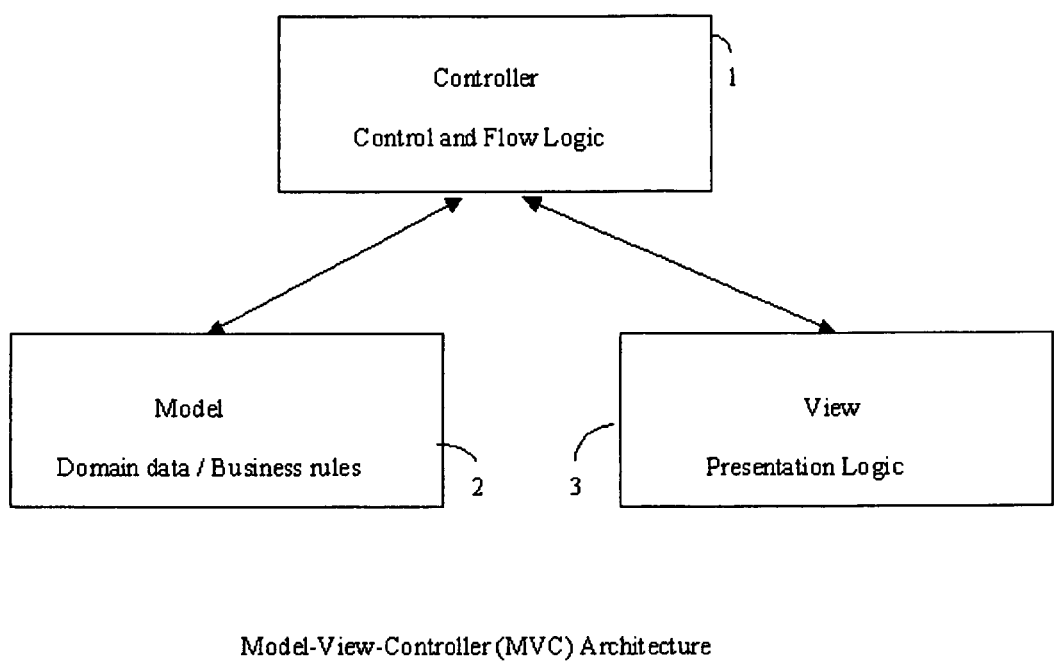
FIG. 1 is a block diagram that illustrates a model-view-controller ("MVC") based application, which may be created using embodiments of the present invention.

In FIG. 1 the MVC breakdown as it applies to active web page design is illustrated. A finer breakdown of these areas of concerns is presented in FIG. 2. Some of these areas, Model 7 and Controller Action Handlers 4, are amenable to common modeling techniques. It is the remaining areas, as well as their integration and cross-referencing to other sections of specifications, that are the focus of this invention; these comprise of Navigational Control 5, Model to View Mediation 6, as well as the View Presentation 8, Control Logic 9 and Data 10.

Figure 3:
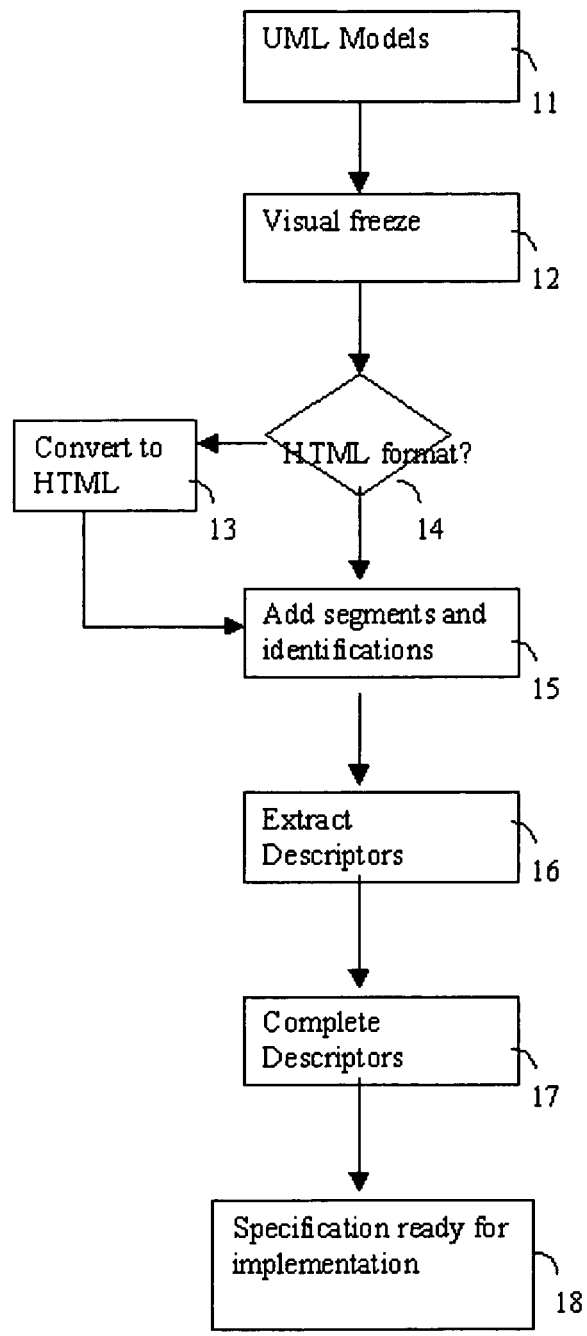
FIG. 3 is a flow chart illustrating the overall flow for specification gathering for MVC, in accordance with the embodiment of the current invention.
Figure 4:
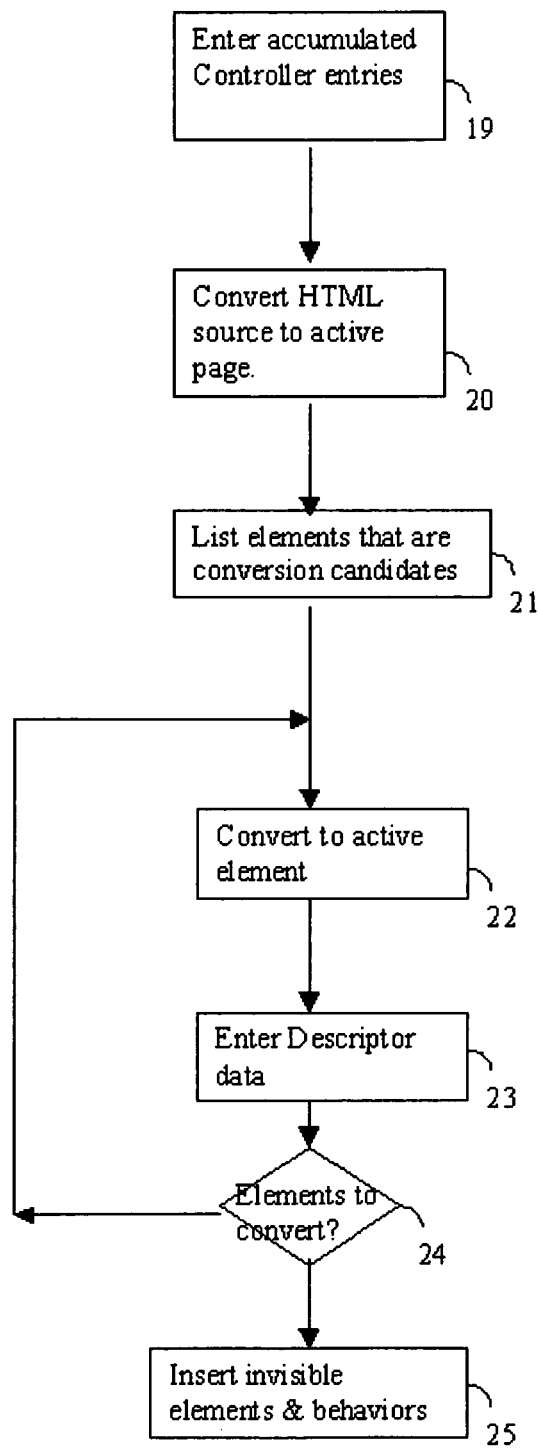
FIG. 4 is a flow chart of the steps and information used for the implementation of MVC based application, in accordance with the embodiment of the current invention.
Figure 5:
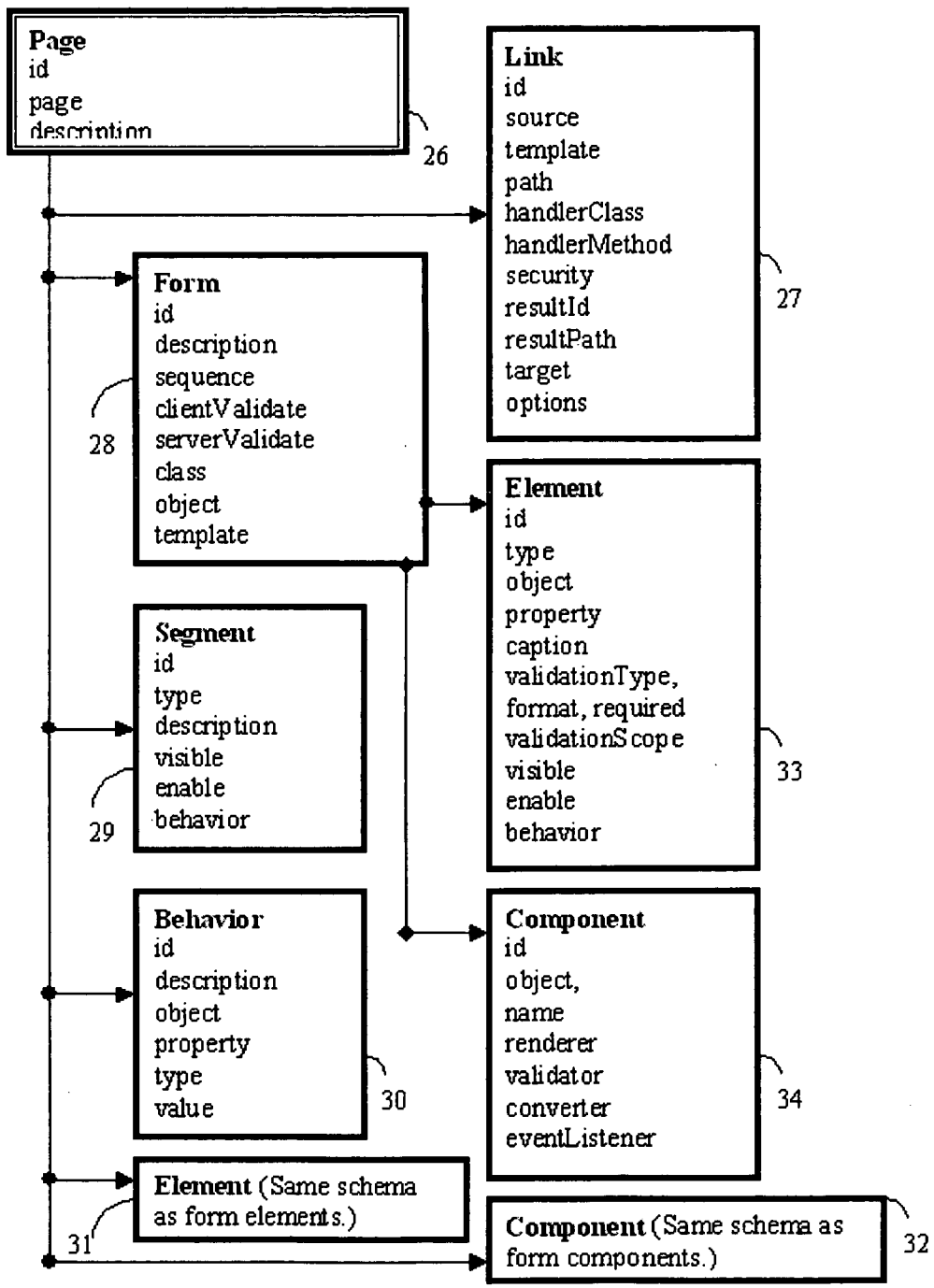
FIG. 5 shows the hierarchy and schema of the descriptors used to capture specification, in accordance with the embodiment of the current invention.

In the preferred embodiment of this invention, processes, illustrated in FIGS. 3 and 4, are used for the specification capture and the subsequent implementation. For the representation of these specifications, descriptors shown in FIG. 5 and specially annotated mock-up pages source code are utilized.

FIG. 3 is a flowchart of the embodiment of the specification process of this invention. The starting point is the specification models for those areas mentioned above as being amenable to modeling using the prevailing arts: the model tier, the navigational actions handlers, as well as other areas like the user interactions with the system. The preferred embodiment utilizes the UML models. The next step involves the transformation or creation of source code that implements the look and feel of the application, presentation, as well as pertinent client activities 12. This invention accommodates the diversity of means of arriving at the mock-up pages or visual freezes when using the prevailing arts, by providing steps for the creation or conversion of source HTML source code for the capture of the presentation aspects of an application. This invention provides means for annotation of segments of said source code for the specification of server side behaviors 15. The next step 16 involves the extraction of the descriptors from the annotated source code from the previous step. This would serve as the template for specifying the active aspects of the pages, as well as means to link the specification of the view tier with those of the model and the controller, in the subsequent steps. The system and method of the invention provided for collaborative steps for completion of these descriptors 17. In the finalization of the specification 18, the invention prescribes process for cross checking the specification across the different models.

The details of the embodiment of the specification method, is presented below, with reference to FIG. 3.

Specification Process

UML Models

The process of the invention starts with models that cover the business object and action sequences. These initial models could be recorded in the UML Models 11. Within the UML documentation would be the screen capture or the Visual Freeze 12; this could be a supporting document to the Use Case diagrams.

Mock-Up Pages Source Code

The invention provides for methods to arriving at HTML source code that captures the application presentation as well as providing means to generate the set of mock-up pages that represents the Visual Freeze. The other effect is that, this code would be the starting point for active page development.

This process accommodates issues like, pages that are variation of each other, segments with visibilities and appearances that depend on server side behaviors, as well as pages that include other template pages.

This step also provides for establishing the identification for the elements and segments on the pages, for cross-referencing to applicable descriptors.

The items of concern are form and its visible elements, links, non-visible elements, segments and text content. The first three items are needed for the mock-up presentation. The issue is to align any names or identifications to known names within the domain data, objects, or transfer objects. Early adoption of these identities would ensure easy identification of items between the source code and the descriptors.

The invention provides means of introducing all items in the source code, even when they do not have visual impact. The annotations provided, allow the definition of segments with behaviors attached and segment that are only for visual presentation, as in the case of dummy data.

Since text is the main essence of HTML pages, they are rarely entered with special identifications. Some of the text content could be derived using server behaviors; the invention provides means of wrapping identification around those text segments. The delineation provides two types of text segments, those originating from domain object and those originating from message resources. The latter is the basis for providing internationalization schemes.

Descriptors Initial Extraction

This step involves the extraction of a set of descriptors 16, based on the content of the HTML source code, prepared in the earlier steps.

This process depends on the annotation and scheme employed in the mock-page developed in the earlier stage.

Firstly, there are set of HTML elements that usually have active equivalent on active platforms.

Comment styles are provided by this invention, to delineate segments, elements and components. Since these entries are comments on the page, they do not affect the appearance of the mock-up pages. For instance, a component might be included on the page as a GIF file, for the sake of screen specification.

In this step, these invisible items would have placeholders within the descriptor documents.

Descriptors Completion

With these initial descriptors, the process of completing 17 the rest of the information would follow.

Because of the diversity of information, including domain data, controller actions, validation requirement, web states, security or data in client cookies, it is possible that more than one individual would have to participate in the completion of these descriptors.

The invention provides a collaborative means of accumulating information that includes, mapping to domain data, objects, or transfer objects and attributes, mapping to controller event handlers and navigational results, defining behaviors and applying them to the requisite segments. Also included are validation requirements, information on role based security, and externalization of text for internationalization.

Figure 2:
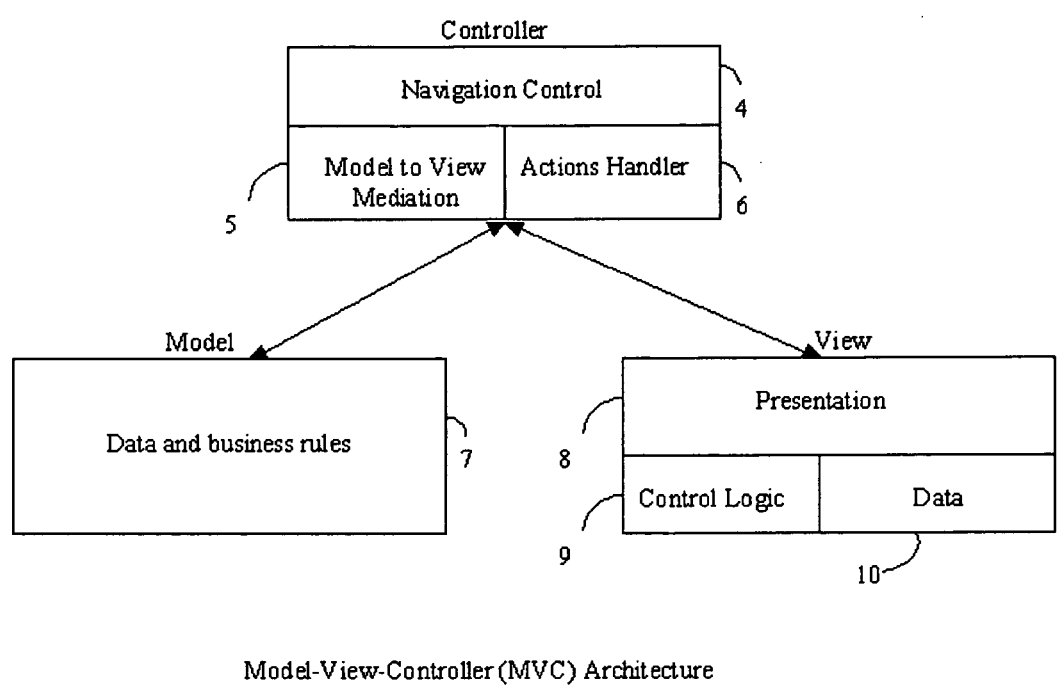
FIG. 2 is a block diagram of MVC application architecture, showing areas of concerns, with respect to the gathering of specifications.

These descriptors cover the specification of the Control Logic, Data and aspects of the Presentation areas (shown in FIG. 2.) Whereas the look and feel part of the presentation is capture in Mock-up source code, the effect of server behaviors on the presentation is captured by the descriptors.

A subset of attributes from these descriptors is presented below, as to how they capture the specification requirements for certain aspects of the MVC application.

Control Logic link:source—The source attribute of the link descriptor captures the initial entity or element, in a navigational action. This recognizes the fact that simple links as well as form button submission could initialize navigation, as well as elements reacting to event and making AJAX calls.

link:template—The template attribute of the link descriptor indicates whether that particular link descriptor could be used as a model for other links. Since some common links might be used in multiple pages, their accompanying information should not be specified repeatedly.

link:path—The path attributes allow the capture of unique paths through the controller, along with the security credentials needed to request that path, the handler classes involved (handlerClass, handlerMethod), as well as the resulting path (resulted, resultPath). These capture the paths that are under the control of the controller, the security credential required to access them, the handlers of such requests, and the possible consequences.

Data form:object—The form and element descriptors provide the capture of the domain data mapping. Whereas the form descriptors capture the mapping on the class or object level, the elements usually map to attributes of such objects. The components descriptors allow the inclusion of elements that require more coarse mapping to the domain models.

form:element—These descriptors also provide other information that allows for the specification of formatting, client side and server validations and wizard page sequencing.

Presentation

The invention provides for the descriptors that complement the information in the mock-up pages source code. The latter is the repository for the specification of the style: look and feel, and client side activities.

The invention provides for segment descriptors that identify segments of the page that need additional server side behaviors for rendering.

A list of such behaviors that are available for a page is kept in the behavior descriptors. These behaviors could be of types involving domain objects, domain business rules, as well as states and transfer objects, kept by the controller, parameters provided by caller or calling pages, cookies on client machine, as well as user credentials and roles provided by the authentication scheme.

Accumulate Controller Declarations

As indicated earlier, the invention caters for the specification of the Controller tier by accumulating the View information for the individual pages. Whereas the page descriptor documents actions used by a page, the controller documents all possible actions of all pages in the application. Whereas, the form descriptor maps the form to the domain model (binding), the controller keeps information on all mapping objects, in the application. This allows the controller to keep pools of objects to service the requests.

This step involves the agglomeration of information on the individual pages into two documents or descriptors, one to cover the Model to View mediation, the other to cover the control scheme.

Specification Finalization

Since this process could be iterative, this invention specifies checks for the finalization of the specification. This verification could involve review of the logical information in the UML diagrams. As mentioned in the background of relevant arts section, there are ample modeling tools that capture relevant information on MVC applications. However, the details they capture, or the angle or perspective they present is not the same as needed for the development of this type of application.

Despite this, it is necessary to verify that such alternative logical representations and the physical representation arrived at using these processes entail the same end points. This would ensure validity of the design exercise.

It is the completion of these reviews that would signal the end to the specification stage.

Implementation

FIG. 4 is a flowchart of embodiment for the implementation method and system of the invention. The starting point is the entry of accumulated entries for the controller 19, thereby converting the lists compiled for the controller specification into platform compatible format. The next steps involve the iterative conversion of identified elements in the source code to their equivalent active component in the target platform. The balance of the entries from the various descriptors would then follow.

The details of the embodiment of the implementation method and system, is presented below, with reference to FIG. 4.

Enter Accumulated Controller Entries

The invention provides for the step for the transformation of accumulated controller data into target framework specific format. This involves a template that matches the descriptors and their attributes to those of the target framework.

This would usually be XML configuration file; for Struts framework, this is the struts-config.xml file, whereas JSF would use face-config.xml.

The accumulated navigational paths would be entered as action entries in the action-mapping data for Struts configuration; in JSF it would be entered as navigational-rule entry.

The accumulated form data mappings would be entered as form-bean entry for Struts configuration, and managed-bean entry for JSF.

Convert Html Source Code to Active Page

The next step provided by the invention, involves the conversion of mock pages source file 20 from the common type (.html, .htm) to the type used by the target MVC framework.

Different frameworks or platforms recognize different extension for the files that represents their source pages. For instance, for the Struts Framework, the "jsp" extension file would suffice, whereas for JSF it would be ".faces".

By selecting a source file for conversion to active page, the system would change the extension to the requisite type and insert any declaration or header needed by the framework.

List Elements for Active Conversion

From the type of elements in the source code, the special annotation therein, as well as the entries in the descriptors pertaining to the current page, a set of items could be presented for conversion to active components 21.

Convert to Active Element

The steps involved the conversion of selected elements to their active equivalent 22. This would be conducted with a mapping table. As shown earlier, selected elements could be mapped to equivalent active components. The first step is the conversion on the elements level, followed by the attribute level; mapping tables would drive all these.

Along with the attribute extracted from the static representation on the mock-page source code, active information would be added from the descriptors 23.

This conversion could be conducted using a tool, IDE, manual process, or a mixture of some or all of these.

Insert Invisible Elements and Behaviors

The step above would take care of items that are present in the mock-up pages or their source code.

The invention also provide for the inclusion of items in the descriptors that have no visible representation. This step involves the selection and insertion of such active elements represented in the descriptor, as well as the entry of the accompanying data.

Also, behaviors generally do not have visible representation on the static pages. The invention provides for the translation of these generic behaviors into platform specific logic or representation, after with such behavior would be applied to segments and elements as specified in the descriptors 25.

Mode of Operation

All steps presented above, could be conducted manually or with assistance of tools or an Integrated Development Environment, or a mixture thereof. The descriptors could be represented in plain text, text in tabular form, property sheets, spreadsheet, XML document, or database tables.

Operations of Invention

To illustrate the operation of the invention, a case of an active web page used to collect credit card information is presented here.

UML Models

References would be made to classes and objects that would be derived from the UML models using the prevailing arts. For this illustration, only the Use Case narratives are provided with the screen mock-up picture.

The Use Case document, illustrated in FIG. 20, shows a credit card payment application.

Visual Freeze

The visual freeze consists of the set of mock-up pages that represent the documented specification of the look and feel of the application. The mock-up screens for this application are illustrated in FIG. 6a and FIG. 6b.

These are identical screens, except for inclusion of the "Apply for . . . Card" phrase in FIG. 6a, but absent in FIG. 6b. The appearance of the page would differ, depending on whether the client already subscribed to a particular credit card.

Mock-Pages Source Code

The corresponding source code is shown in FIGS. 7a and 7b. The identification of the elements has been aligned with the model; the segments that employ behavior were annotated.

Descriptors Initial Extraction

Based on the HTML elements and annotations in the source code (FIGS. 7a and 7b), a set of completed descriptors would be extracted from the page. The descriptors involved are page, link, form, element, segment and behaviors. The different items on the screens that contribute to these descriptors are shown in FIGS. 6a and 6b. References are made to these figures in the discussion below.

Page Descriptor:

The page descriptor is the container for all information on the page. It also identifies the source page; it would also identify eventually the implemented active page.

Link Descriptor:

There are three links on the page. The first 35 allow the user to review the order or the payment method. The second 36 (Apply for DWIZ) would only appear if the user were not a card member for the company owned credit card.

The third link 37 on the page is the Submit Order! Button; as would be seen later, this provides an example of an element that could have information in multiple descriptors.

Element Descriptor:

In all, there are 11 elements on the page; their corresponding captions are: Name on Card—38, Type—39, Card Number—40, Expiration (MM)—42, Expiration (YY)—42, Same as Shipping—41, Address—43, City—47, State—45, Zip Code—46 and Submit Order!—44.

Within the source code, each of the elements has identifications that align with the objects in the domain.

Form Descriptor

This is the HTML way of grouping elements for submission to server, however it has no visual representation; information on this would be extracted from the source code.

Segment Descriptor:

As mentioned earlier, the segment delineations are not directly visible on the page. However, the area around the second link (Apply for DWIZ) has been annotated as a segment in the source code FIGS. 7a and 7b.

Descriptors Completion

Listed below are the illustrations that provide the full set of completed descriptors, for the exemplary application.

The page descriptor, with its associated link descriptors is shown on FIG. 8.

The form descriptor, with its associated element descriptors is shown on FIG. 9.

The segment descriptor is shown on FIG. 10.

The behaviors descriptor is shown on FIG. 11.

Specification Finalization

The set of descriptors, the mock-up source code, as well as the set of UML documents would provide the final specification for the application. Although the exemplary operation involves a single page and few resulting actions, it would be easy for one within the arts to extend this to larger applications. The finalization steps would involve verification that logical flow and activities as represented in the different perspectives are indeed consistent.

This exemplary application is used to further illustrate the implementation aspect of the invention.

Implementation

The implementation steps now follow:

Accumulate MVC Navigational Declarations

The information to be accumulated for the Navigational Declaration emanates from the link descriptor 8 and form descriptor 9.

The composite link information, from the perspective of the controller, could be expressed in XML as follows, as shown in FIG. 21.

Simple mapping of the generic descriptor information 51 to Struts specific configuration 52 is all that is needed to accomplish this task.

Accumulation of Domain Data Mapping

Two examples of domain mappings on the Struts platform are shown here. In the first case, the objects involved are defined in the UML documents; in which case, reference is only made to that object here 54. The information is extracted from the form descriptor; in a broader situation, there would be multiple form descriptors, as such the number of form-bean entries would be multiple.

However, there are provisions to define mapping objects in place, base on composites of the form and element information 55.

Convert Html Source Code to Active Page

The HTML source code would have extensions like "html" or "htm". For recognition by the framework, the extension must be changed. For instance, for the Struts Framework, the extension is ".jsp", Struts is based on Java Server Pages.

Figure 12:
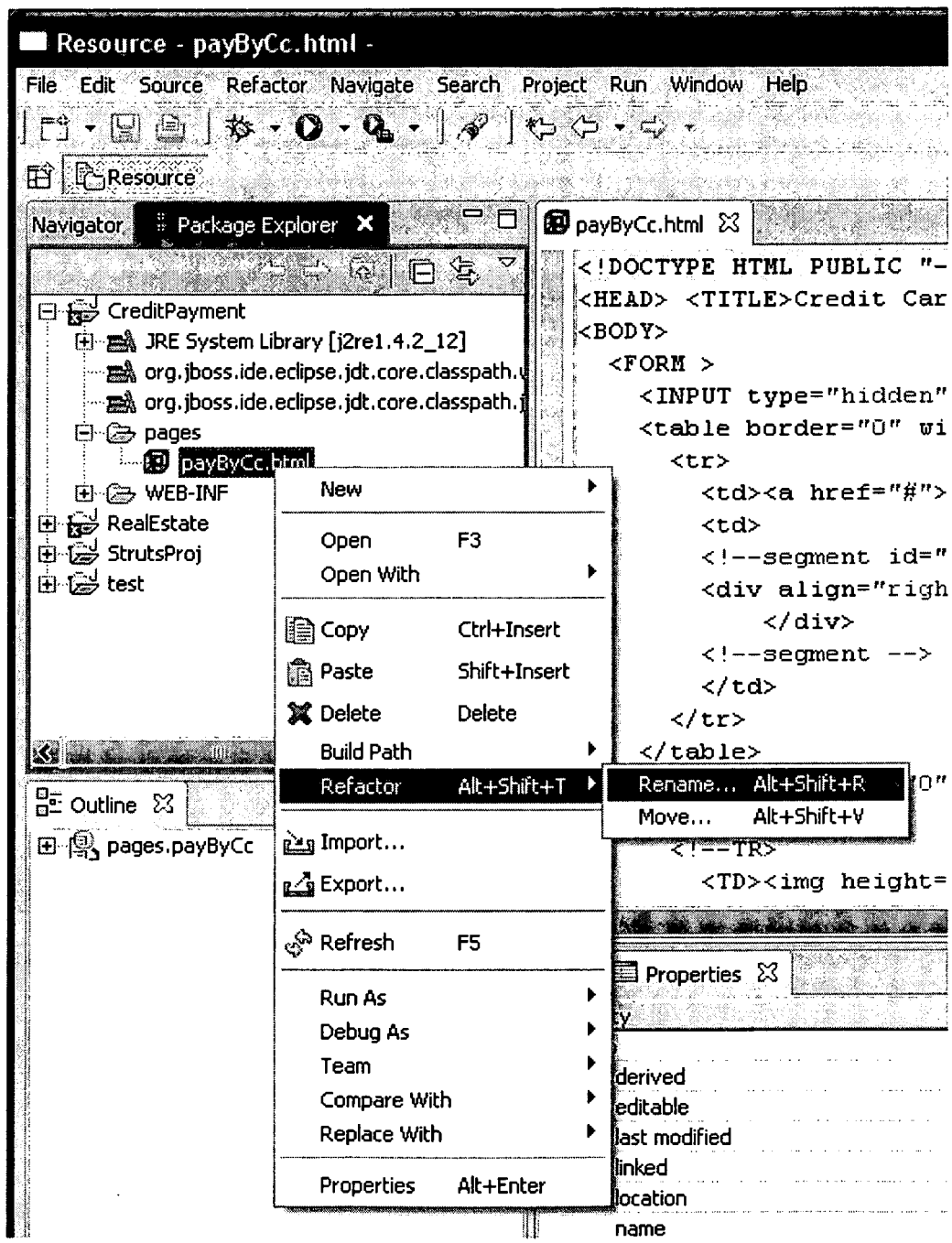
FIG. 12 is a bitmap screen shot of GUI screen that shows the selection of mock-page source for conversion into target MVC based source code; used to illustrate a step in the operation of the preferred embodiment of this invention.

FIG. 12 shows the process being conducted within an IDE.

Figure 13:
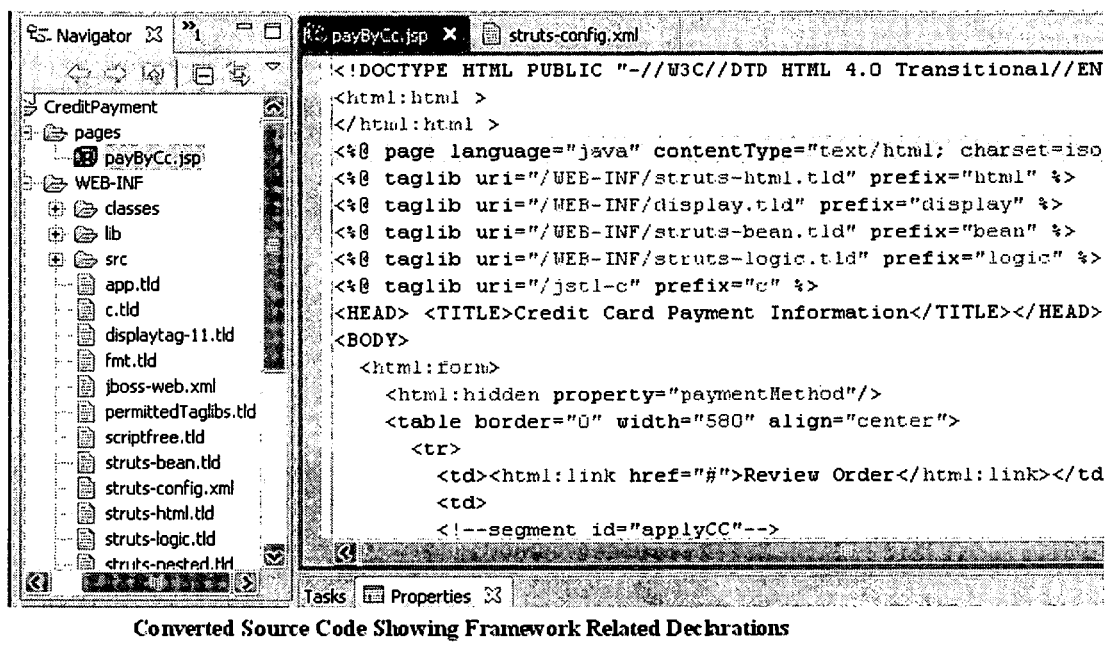
FIG. 13 is a bitmap screen shot of GUI screen that shows the converted source code with target MVC framework declarations inserted; a step in the preferred embodiment and operation of this invention.

As part of the conversion, there are some declarations that are needed within the code. This is illustrated in FIG. 13.

List Elements for Active Conversion

Figure 14:
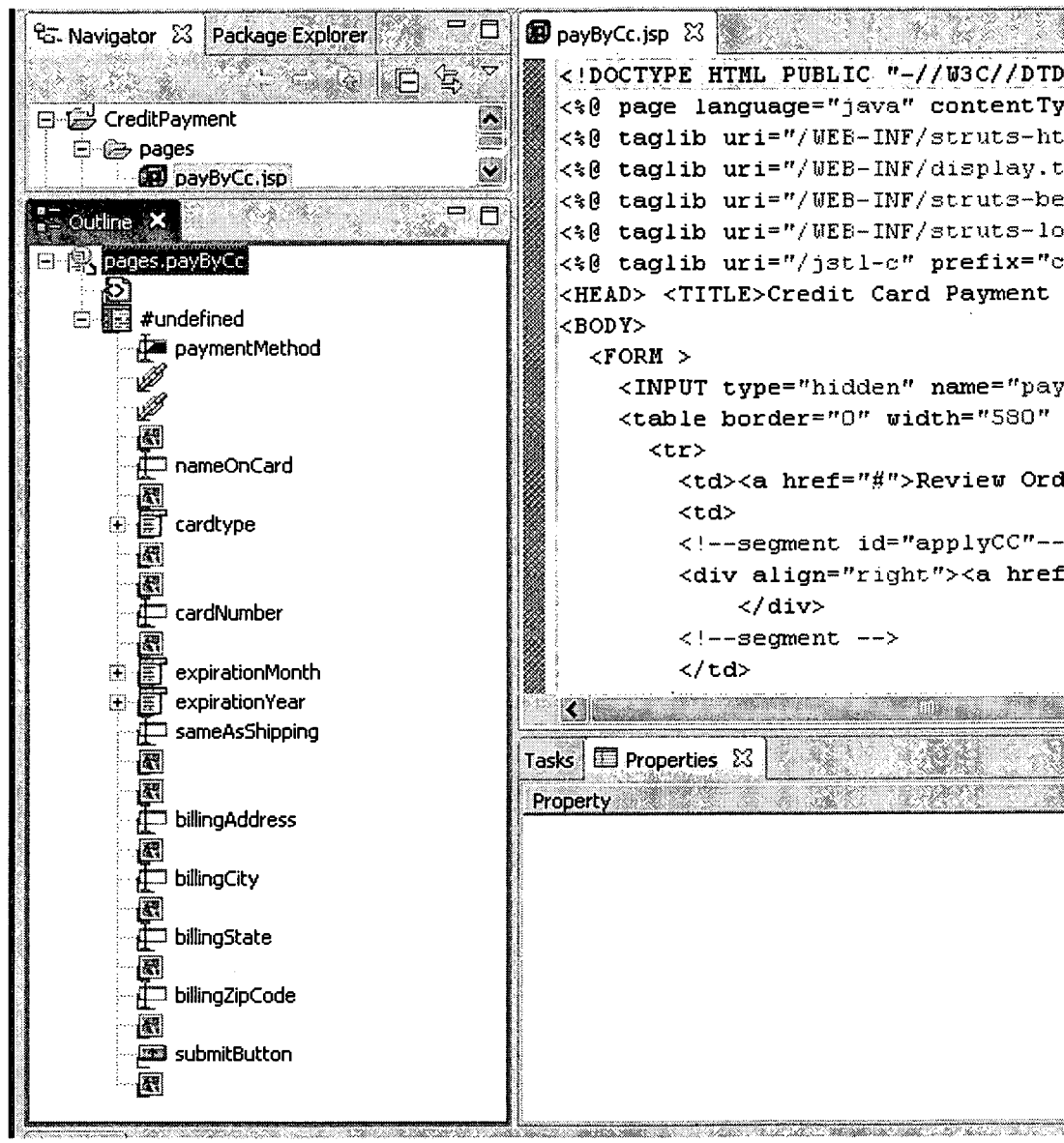
FIG. 14 is a bitmap shot of GUI screen that shows list of candidate elements for conversion to active elements of the target MVC framework; a step in the preferred embodiment and operation of this invention.

Elements that could potentially be converted to active elements are shown in the IDE as illustrated in FIG. 14. These elements have annotations or decorations; in this case, the red angle in the left hand corner.

Based on the entries in the descriptors, a list of elements in the source code would be candidates for conversion.

Convert to Active Element

Figure 15:
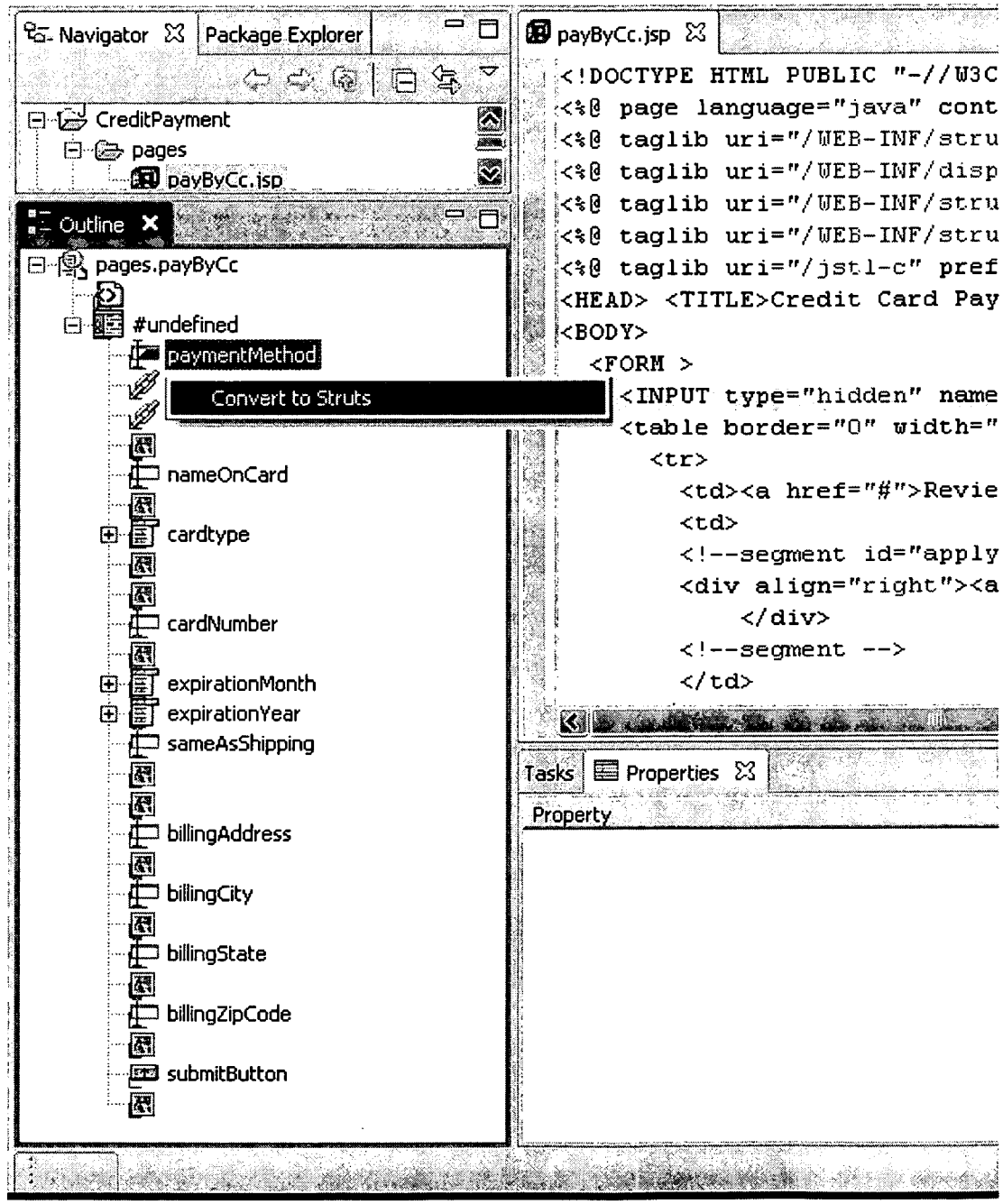
FIG. 15 is a bitmap shot of GUI screen that shows selection of particular candidate elements for conversion to active elements of the target MVC framework; a step in the preferred embodiment and operation of this invention.

Elements could be selected for conversion as illustrated in FIG. 15.

Figure 16:
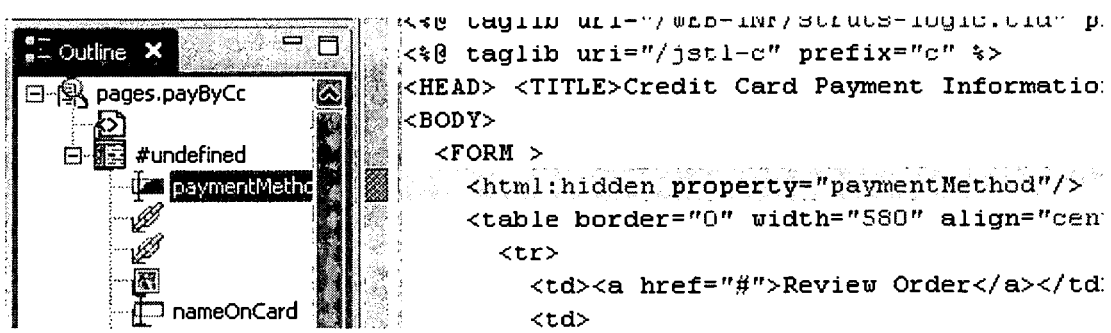
FIG. 16 is a bitmap shot of GUI screen that shows converted active elements of the target MVC framework; a step in the preferred embodiment and operation of this invention.

This conversion involves replacing the syntax describing the HTML element, with the requisite describing used by the framework. Further the attributes would need to be converted as applicable within the framework. The result of such conversion is illustrated in FIG. 16. Once converted to the equivalent active component, the decorator would also be removed.

Firstly, there are set of HTML elements that usually have active equivalent on active platforms. Examples of active component representations for the HTML input text on three platforms are the following: Struts—html:text, JSF—h:inputText and ASP.NET—aspx:text.

A mapping table of equivalent active elements is used to convert the elements on the source page to their active equivalent.

There are also some mapping to be done between the HTML tag attributes and active element attributes.

Enter Descriptor

Figure 17:
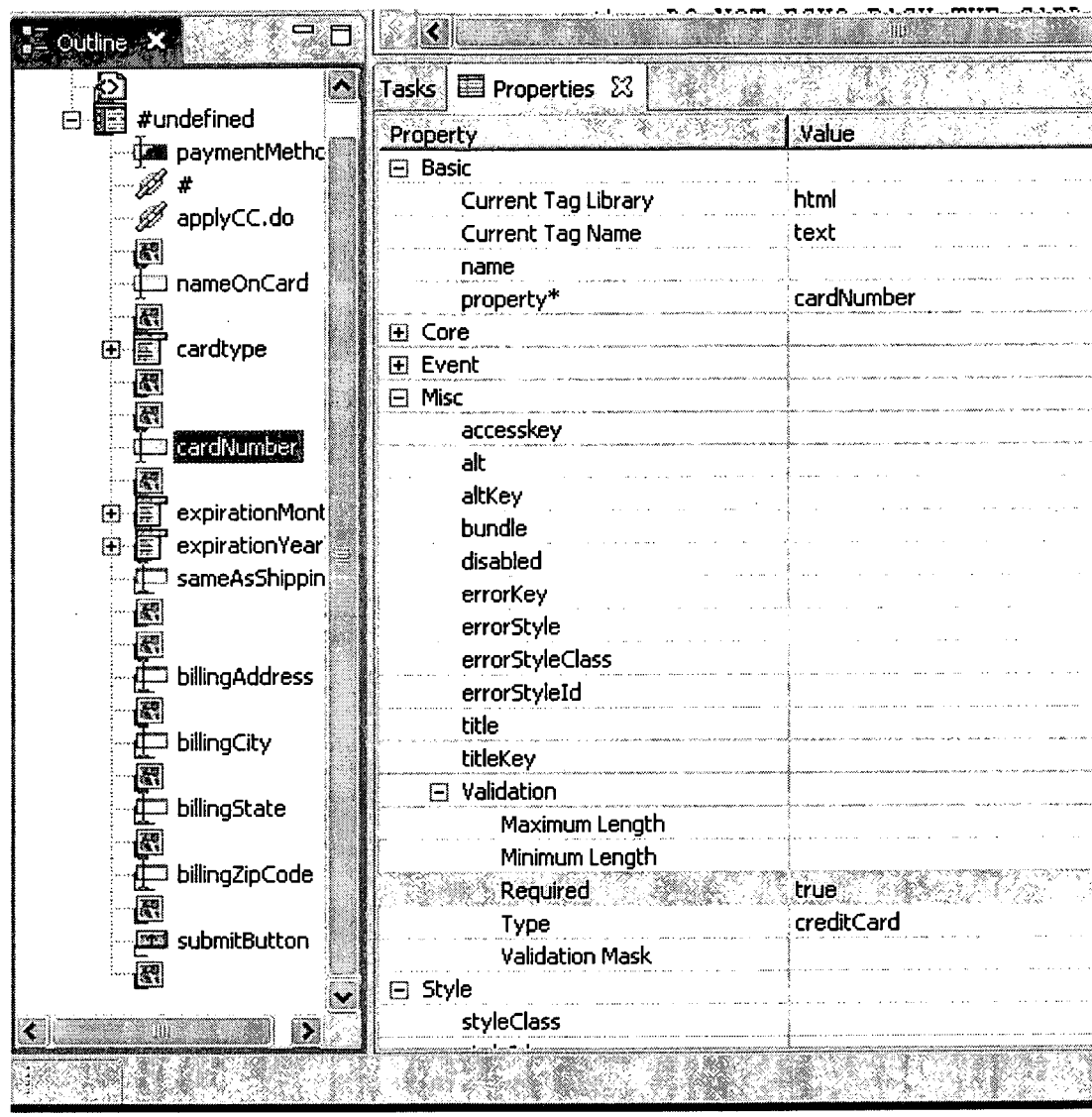
FIG. 17 is a bitmap shot of GUI screen that shows converted active elements of the target MVC framework, with the entry sheet for descriptor data; a step in the preferred embodiment and operation of this invention.

The descriptor information, which actually relates to active elements, would now be entered. The IDE would present a property sheet that provides entry points for the descriptor data. This is illustrated in FIG. 17.

Insert Invisible Elements and Behaviors

Figure 18:
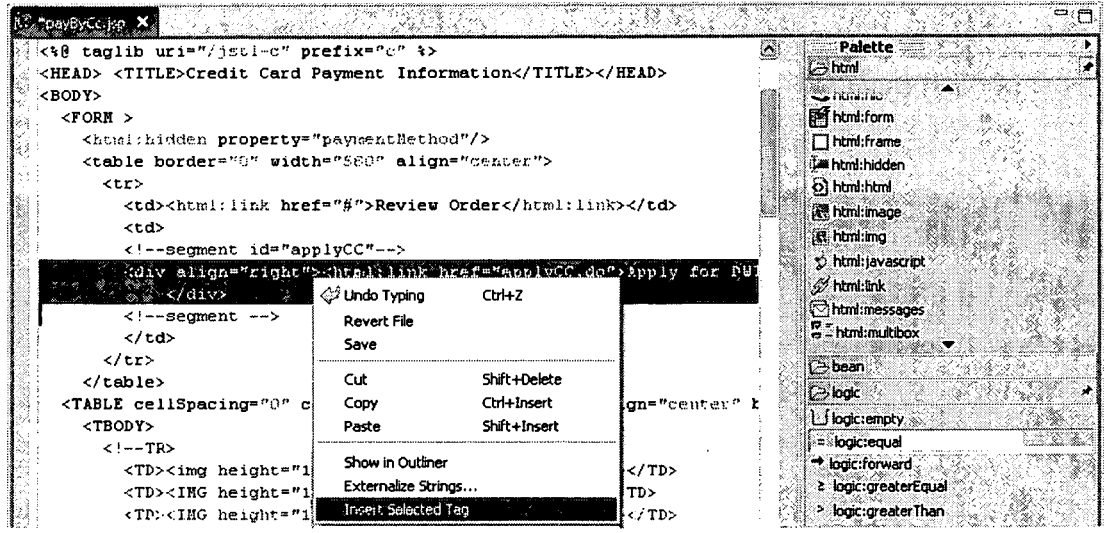
FIG. 18 is a bitmap shot of GUI screen that shows segment selection, a pre-cursor to behavior, with the entry sheet for behavior descriptor data; a step in the preferred embodiment and operation of this invention.
Figure 19:
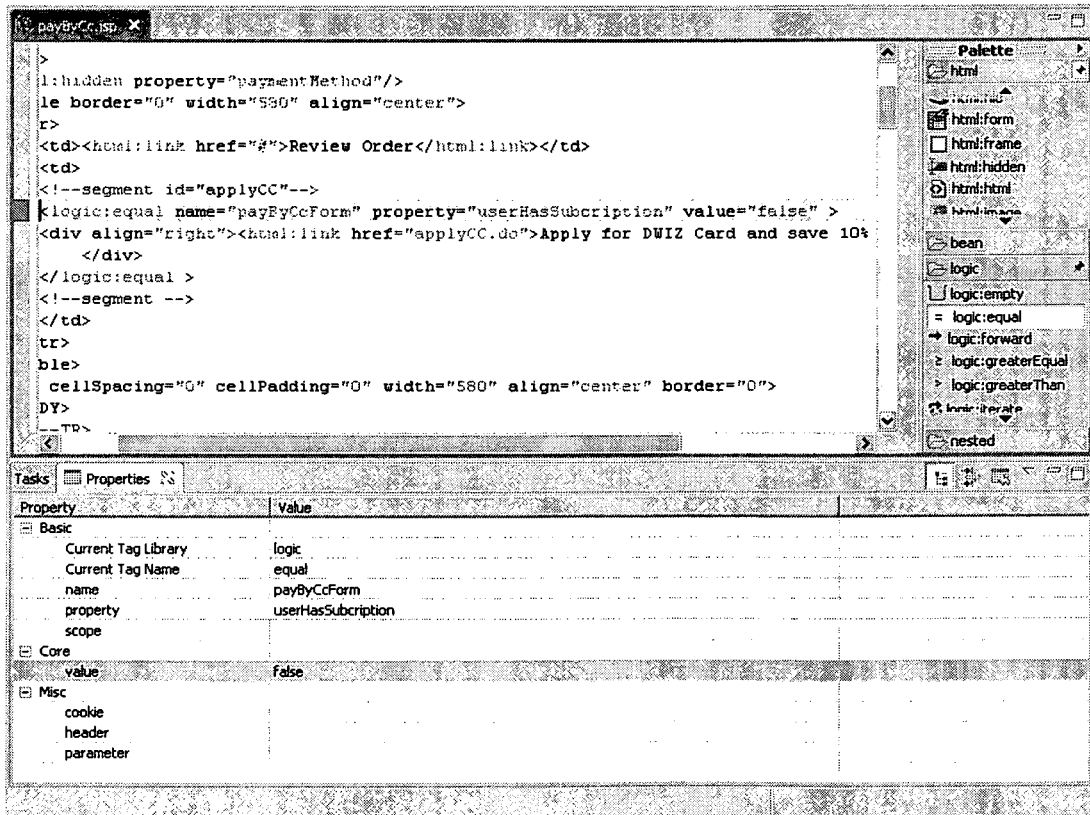
FIG. 19 is a bitmap shot of GUI screen that shows behavior application to segments, with the entry sheet for descriptor data; a step in the preferred embodiment and operation of this invention.

In this step, segments could be selected for behavior application, as shown in FIG. 18. The behaviors specified in the descriptor, could then be selected from a tool bar or palette 19, for application to such segment.

These would complete the source code implementation for the example application.

CONCLUSION, RAMIFICATION, AND SCOPE OF INVENTION

While the invention has been described with reference to an exemplary operation of the preferred embodiment, it will be understood by those skilled in the art that various changes may be made and equivalents may be substituted for elements thereof without departing from the scope of the invention. Therefore, it is intended that the invention not be limited to the preferred embodiment demonstrated, but that the invention will include all embodiments falling within the scope of the appended claims. For example, the present invention should not be limited by framework or programming language; also, these mappings are not limited to UML modeled objects or classes. Other means for representing domain data or objects could be used as targets of the mapping scheme.

What is claimed is:

1. A method for specifying an entire active web application that is based on the MVC (Model View Controller) architecture, comprising:
capturing platform agnostic, non-automated specifications for the MVC view tier of an MVC web application,
wherein the specifications are captured prior to the implementation phase of the software development life cycle and prior to runtime of the web application,
wherein the specifications for the MVC view tier of the web application include specifications for static and dynamic aspects of page presentation that are captured prior to the implementation phase of the software development life cycle and prior to runtime for the web application,
wherein the specifications for the MVC view tier are captured by content artifacts prior to the implementation phase of the software development life cycle and prior to runtime for the web application, and
wherein the content artifacts include annotations of pre-implementation source code for presentation aspects of the web application wherein the annotations of pre-implementation source code identify segments of the pages of the web application where presentation of the page segments depends on server side information; and
creating descriptors for elements of the source code that are affected by server side information wherein each descriptor specifies a presentation from a plurality of presentations based on server side information for the corresponding element.

2. The method of claim 1 wherein the descriptors include a page descriptors, the method further comprising deriving platform agnostic specifications for the MVC controller and model tier of the MVC web application based on the descriptors.

3. The method of claim 2 further comprising converting the platform agnostic specifications for the MVC view, controller, and model tiers of the web application into application code suitable for a target platform.

4. The method of claim 1 wherein said content artifacts are static web application files including, HTML source files, style sheets source files, graphics and animations files and client scripts.

5. The method of claim 1 wherein the annotations of pre-implementation source code identify dynamic segments of the pages of the web application.

6. The method of claim 1 wherein said descriptors include a link descriptor.

7. The method of claim 1 wherein said descriptors include a form descriptor.

8. The method of claim 1 wherein said descriptors include a segment descriptor.

9. The method of claim 3 wherein converting the platform agnostic specifications for the MVC view, controller, and model tiers of the web application into application code suitable for a target platform comprises identifying elements in the pre-implementation source code for conversion to active elements and components; performing active elements and attributes mapping of static elements in the pre-implementation source code to application code suitable for the target platform-, behavior mapping, and transfer of descriptors information into elements, components and behavior attributes for the target platform.

10. A non-transitory computer readable medium comprising a set of instructions for specifying an entire active web application that is based on the MVC (Model View Controller) architecture, the computer readable medium which, if executed by a processor, cause a computer to display pre-implementation source code for presentation aspects of the web application; annotate, based on user input, segments of the source code corresponding to page segments of the web application that depend on server side information; display templates for descriptors of elements of the source code; store descriptors based on user input wherein each descriptor specifies a presentation from a plurality of presentations based on server side information for the corresponding element, derive platform agnostic specifications for the MVC controller and model tier of the MVC web application based on the descriptors, and convert the platform agnostic specifications for the MVC view, controller, and model tiers of the web application into application code suitable for a target platform.

11. The non-transitory computer readable medium of claim 10 wherein the descriptors include a page descriptor.

12. The non-transitory computer readable medium of claim 10 wherein the descriptors include a link descriptor.

13. The non-transitory computer readable medium of claim 10 wherein the descriptors include a form descriptor.

14. The non-transitory computer readable medium of claim 10 wherein the descriptors include a segment descriptor.

15. The non-transitory computer readable medium of claim 10 wherein the descriptors include a element descriptor.

16. The non-transitory computer readable medium of claim 10 wherein the descriptors include a behavior descriptor.

17. The method of claim 1 wherein the descriptors include an element descriptor.

18. The method of claim 1 wherein the descriptors include a behavior descriptor.

\* \* \* \* \*